United States Patent
Hwang et al.

(10) Patent No.: US 9,029,436 B2
(45) Date of Patent: May 12, 2015

(54) ARTIFICIAL SILICA MARBLE HAVING AMORPHOUS PATTERNS AND METHOD FOR PREPARING THE SAME

(71) Applicant: Cheil Industries Inc., Gumi-si (KR)

(72) Inventors: Cheol Yeon Hwang, Uiwang-si (KR); Chang Ho Son, Uiwang-si (KR); Su Sun Jeong, Uiwang-si (KR); Hee Cheol Lee, Uiwang-si (KR); Han Ju Kang, Uiwang-si (KR); Sung Jin An, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/068,045

(22) Filed: Oct. 31, 2013

(65) Prior Publication Data

US 2014/0179847 A1  Jun. 26, 2014

(30) Foreign Application Priority Data

Dec. 20, 2012  (KR) .................. 10-2012-0149768

(51) Int. Cl.
| | |
|---|---|
| C09D 5/29 | (2006.01) |
| C04B 26/18 | (2006.01) |
| C04B 18/02 | (2006.01) |
| C04B 111/54 | (2006.01) |

(52) U.S. Cl.
CPC ............... *C04B 26/18* (2013.01); *C04B 18/022* (2013.01); *C04B 2111/545* (2013.01)

(58) Field of Classification Search
USPC .......................................... 523/171; 524/492
See application file for complete search history.

(56) References Cited

U.S. PATENT DOCUMENTS

| | | | |
|---|---|---|---|
| 5,280,051 A * | 1/1994 | Traverso et al. ............... | 523/171 |
| 2005/0215683 A1* | 9/2005 | Thompson et al. ............ | 524/425 |

FOREIGN PATENT DOCUMENTS

| | | |
|---|---|---|
| KR | 10-0688025 B1 | 2/2007 |
| KR | 10-0833273 B1 | 5/2008 |

* cited by examiner

*Primary Examiner* — Edward Cain
(74) *Attorney, Agent, or Firm* — Additon, Higgins & Pendleton, P.A.

(57) ABSTRACT

An artificial silica marble comprises a matrix and a line pattern portion. The line pattern portion comprises fine lines having a width of about 50 to about 500 μm and forms a web- or net-like pattern. The line pattern portion divides or partitions the artificial silica marble into a plurality of irregularly shaped pattern portions to form an amorphous pattern in the cross section of the artificial silica marble.

13 Claims, 3 Drawing Sheets

ARTIFICIAL SILICA MARBLE HAVING AMORPHOUS PATTERNS AND METHOD FOR PREPARING THE SAME

CROSS-REFERENCE TO RELATED APPLICATION

This application claims priority to and the benefit of Korean Patent Application No. 10-2012-0149768, filed in the Korean Intellectual Property Office on Dec. 20, 2012, the entire disclosure of which is incorporated herein by reference.

FIELD OF THE INVENTION

The present invention relates to an artificial silica marble.

BACKGROUND OF THE INVENTION

Artificial marble is an artificial synthetic material, which has the texture of natural stone and is prepared by adding additives, such as natural stone powder, minerals, resin chips and the like, to resin such as acrylic resin, unsaturated polyester resin, epoxy resin and the like, or a matrix such as cement, and if necessary, adding additives such as a pigment thereto.

Artificial marbles are classified as solid products including no chips and granite products including chips. In addition, depending on the materials used to make the artificial marble, artificial marbles are also classified as acrylic-based artificial marbles, polyester-based artificial marbles, epoxy-based artificial marbles, melamine-based artificial marbles, engineered stone-based artificial marbles, etc. Such artificial marbles can have a beautiful appearance and excellent processability and are lighter and stronger than natural marble. Due to these advantages, the artificial marbles are widely used as various interior and exterior materials, including materials for dressing tables, washstands, kitchen counters, walls, floors, other furniture, and the like.

Various methods for preparing an artificial marble having an amorphous pattern are known, which comprise mixing synthetic resin materials having different colors with each other and injecting the liquid resin mixture into a molding cell. However, artificial marble prepared according to conventional methods does not have the lump-shaped amorphous pattern of natural marble.

Korean Patent Publication No. 0688025 discloses a method for preparing an artificial marble chip comprising an unsaturated polyester resin, a styrene-based monomer and an inorganic filler. This preparation method can prevent sedimentation by controlling viscosity, but the prepared artificial marble chips do not have a lump-shaped amorphous pattern.

Korean Patent Publication No. 0833273 discloses an artificial marble comprising an unsaturated polyester resin, a silica powder, silica sand and a pigment. The publication states that the artificial marble has a metallic texture due to ferrosilicon or silicon metal contained in the silica sand. However, this artificial marble also does not have a lump-shaped amorphous pattern.

SUMMARY OF THE INVENTION

The present invention provides a novel artificial silica marble having formed therein lump-shaped amorphous patterns.

The present invention also provides a novel method for preparing a novel artificial silica marble having formed therein lump-shaped amorphous patterns.

An artificial silica marble according to the present invention comprises a matrix and a line pattern portion. The line pattern portion comprises fine lines having a width of about 50 to about 500 μm and forming a web- or net-like pattern. The line pattern portion divides or partitions the artificial silica marble into a plurality of lump shaped (irregularly shaped) pattern portions to form an amorphous pattern in the cross section of the artificial silica marble.

The artificial silica marble according to the present invention comprises (A) about 5 to about 15% by weight of an unsaturated polyester resin; (B) about 20 to about 35% by weight of a silica powder having a particle diameter of about 10 to about 45 μm; (C) about 48 to about 73% by weight of a silica sand having a particle diameter of about 0.1 to about 5.6 mm; and (D) about 0.01 to about 2.0% by weight of coloring pigment.

The present invention also provides a method for preparing an artificial silica marble having amorphous patterns, the method comprising the steps of: (a) dry-mixing a silica powder, a silica sand and a first pigment to prepare a first pigment-containing mixture; (b) wet-mixing an unsaturated polyester resin with the first pigment-containing mixture to prepare a first mixture of the artificial silica marble; (c) crushing the first mixture of the artificial silica marble; (d) dispersing a second pigment-containing mixture including a silica powder, a silica sand and a second coloring pigment, in the crushed first mixture of the artificial silica marble to prepare a second mixture of the artificial silica marble; and (e) molding the second mixture of the artificial silica marble.

The second pigment-containing mixture dispersed in the first mixture in step (d) forms amorphous patterns by forming the line pattern portion through step (e). The second pigment-containing mixture comprises about 25 to about 74% by weight of the silica powder having a particle diameter of about 10 to about 45 μm, about 25 to about 74% by weight of the silica sand having a particle diameter of about 0.1 to about 5.6 mm, and about 1 to about 50% by weight of the second coloring pigment. The second pigment-containing mixture is used in an amount of about 1 to about 25 parts by weight based on about 100 parts by weight of the first mixture of the artificial silica marble.

DETAILED DESCRIPTION OF THE INVENTION

Figure 1:
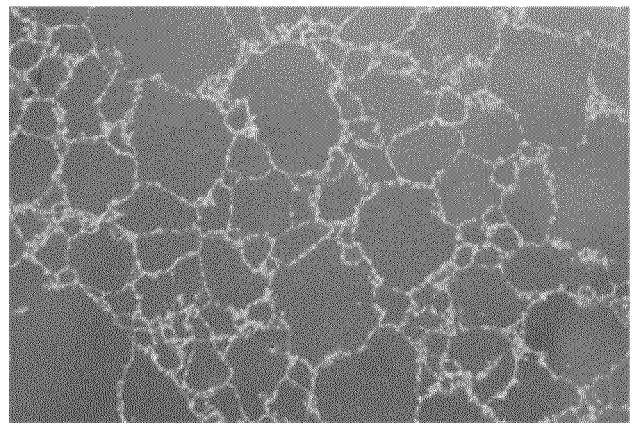
FIG. 1 is a photograph showing the cross-section of an artificial marble according to an example of the present invention.
Figure 2:
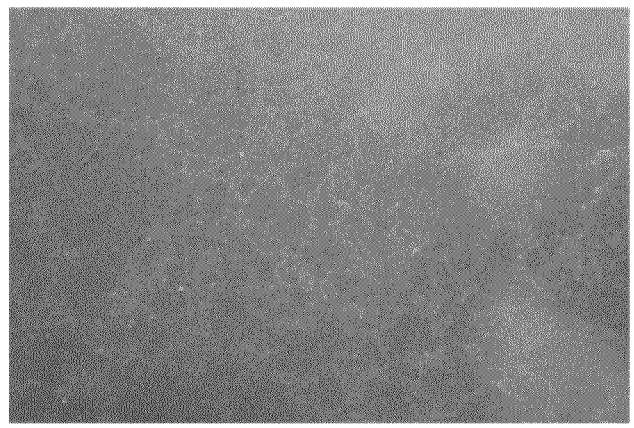
FIG. 2 is a photograph showing the cross-section of an artificial marble according to Comparative Example 1.
Figure 3:
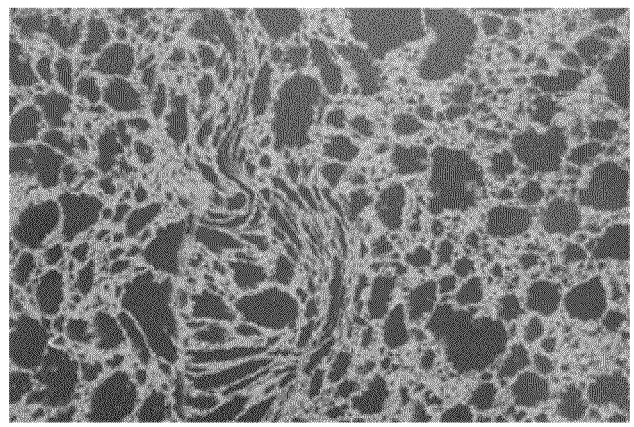
FIG. 3 is a photograph showing the cross-section of an artificial marble according to Comparative Example 2.
Figure 4:
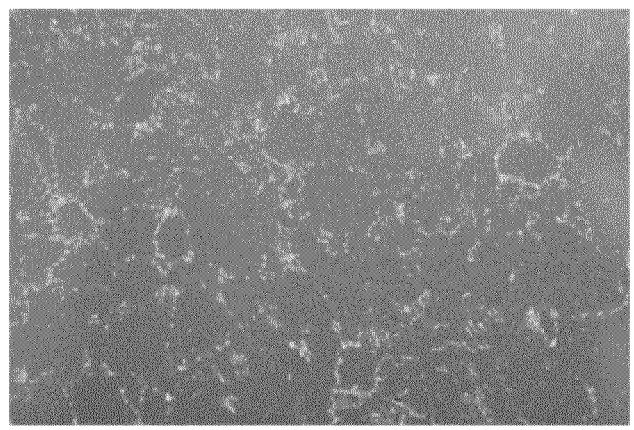
FIG. 4 is a photograph showing the cross-section of an artificial marble according to Comparative Example 3.
Figure 5:
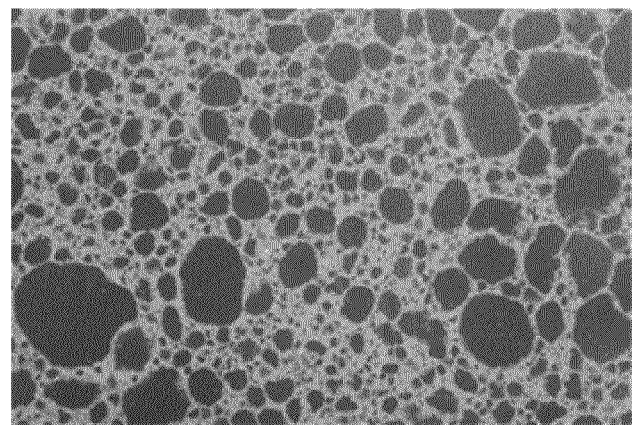
FIG. 5 is a photograph showing the cross-section of an artificial marble according to Comparative Example 4.
Figure 6:
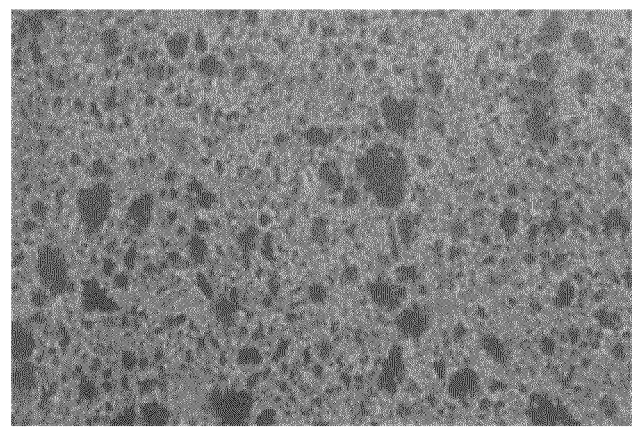
FIG. 6 is a photograph showing the cross-section of an artificial marble according to Comparative Example 5.

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to an artificial silica marble, and more particularly to an artificial silica marble having a novel amorphous pattern and a preparation method thereof.

The artificial silica marble according to the present invention comprises a matrix and a line pattern portion, wherein the line pattern portion comprises fine lines having a width of about 50 to about 500 µm and forming a web- or net-like pattern, wherein the line pattern portion divides or partitions the artificial silica marble into a plurality of irregularly (lump) shaped portions to form an irregularly shaped (amorphous) design or pattern in the cross section of the artificial silica marble. The fine lines are formed not only in the cross-section of the artificial silica marble, but also throughout the whole artificial silica marble.

The artificial silica marble according to the present invention is prepared by a method comprising the steps of (a) dry-mixing a silica powder, a silica sand and a first coloring pigment to prepare a first pigment-containing mixture; (b) wet-mixing an unsaturated polyester resin with the first pigment-containing mixture to prepare a first mixture of the artificial silica marble; (c) crushing the first mixture of the artificial silica marble; (d) dispersing a second pigment-containing mixture including a silica powder, a silica sand and a second coloring pigment in the crushed first mixture of the artificial silica marble to prepare a second mixture of the artificial silica marble; and (e) molding the second mixture of the artificial silica marble.

In step (d), the second pigment-containing mixture that is dispersed in the first mixture of the artificial silica marble forms amorphous patterns due to forming a line pattern portion. The second pigment-containing mixture comprises about 25 to about 74% by weight of the silica powder having a particle diameter of about 10 µm to about 45 µm, about 25 to about 74% by weight of the silica sand having a particle diameter of about 0.1 mm to about 5.6 mm, and about 1 to about 50% by weight of the second coloring pigment.

In some embodiments, the second pigment-containing mixture may include the silica powder in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, or 74% by weight. Further, according to some embodiments of the present invention, the silica powder may be present in an amount of from about any of the foregoing amounts to about any other of the foregoing amounts.

In some embodiments, the silica powder may have a particle diameter of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 µm. Further, according to some embodiments of the present invention, the silica powder may have a particle diameter from about any of the foregoing diameters to about any other of the foregoing diameters.

In some embodiments, the second pigment-containing mixture may include the silica sand in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, or 74% by weight. Further, according to some embodiments of the present invention, the silica sand may be present in an amount of from about any of the foregoing amounts to about any other of the foregoing amounts.

In some embodiments, the silica sand may have a particle diameter of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, or 5.6 mm. Further, according to some embodiments of the present invention, the silica sand may have a particle diameter from about any of the foregoing diameters to about any other of the foregoing diameters.

In some embodiments, the second pigment-containing mixture may include the second coloring pigment in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, second coloring pigment may be present in an amount of from about any of the foregoing amounts to about any other of the foregoing amounts.

The second pigment-containing mixture is used in an amount of about 1 to about 25 parts by weight based on about 100 parts by weight of the first mixture of the artificial silica marble. In some embodiments, the second pigment-containing mixture is used in an amount of about 1, 2, 3, 4, 5, 6, 7, 8, 9, 10, 11, 12, 13, 14, 15, 16, 17, 18, 19, 20, 21, 22, 23, 24, or 25 parts by weight. Further, according to some embodiments of the present invention, the second pigment-containing mixture may be used in an amount of from about any of the foregoing amounts to about any other of the foregoing amounts.

Each step of the above preparation method will now be described in detail.

Step (a)

Step (a) of the inventive method for preparing the artificial marble is a step of preparing a first pigment-containing mixture by dry-mixing a silica power, a silica sand and a first coloring pigment.

Because the particle diameter of the coloring pigment is small, it is used in the form of the first pigment-containing mixture obtained by dry-mixing it with the silica powder and the silica sand.

The silica powder can have a particle diameter of about 10 to about 45 µm. In some embodiments, the silica powder used in the first pigment-containing mixture may have a particle diameter of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 µm. Further, according to some embodiments of the present invention, the silica powder first pigment-containing mixture may have a particle diameter from about any of the foregoing diameters to about any other of the foregoing diameters.

If the particle diameter of silica powder is less than about 10 µm, the viscosity of a composition for preparing the artificial marble can be excessively increased, making it difficult to mix the composition. If the particle diameter of the silica powder is more than about 45 µm, it can provide insufficient filling property, and thus the surface quality of the marble can be reduced.

The silica sand can have a particle diameter of about 0.1 to about 5.6 mm. In some embodiments, the silica sand used in the first pigment-containing mixture may have a particle diameter of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, or 5.6 mm. Further, according to some embodiments of the present invention, the silica sand used in the first pigment-containing mixture may have a particle diameter from about any of the foregoing diameters to about any other of the foregoing diameters.

If the diameter of the silica sand is less than about 0.1 mm, the viscosity of a composition for preparing the artificial marble can be excessively increased, making it difficult to mix the composition. If the diameter of the silica sand is more than about 5.6 mm, the surface quality of the marble can be reduced due to insufficient filling property.

Examples of the first coloring pigment can include without limitation inorganic and/or organic pigments and/or dyes. In exemplary embodiments, examples of the first pigment that is used in the present invention can include without limitation red brown pigments such as iron oxide, yellow pigments such as iron hydroxide, green pigments such as chromium oxide, navy blue pigments such as sodium aluminosilicate, white pigments such as titanium oxide, black pigments such as carbon black, and the like, and combinations thereof.

The first pigment-containing mixture according to the present invention comprises about 20 to about 35% by weight of the silica powder, about 48 to about 73% by weight of the silica sand and about 0.01 to about 2.0% by weight of the first coloring pigment, based on 100% by weight of the first mixture comprising the unsaturated polyester resin, the silica powder, the silica sand and the first coloring pigment, described below.

In some embodiments, the first pigment-containing mixture may include the silica powder in an amount of about 20, 21, 22, 23, 24, 25, 26, 27, 28, 29, 30, 31, 32, 33, 34, or 35% by weight. Further, according to some embodiments of the present invention, the silica powder may be present in an amount of from about any of the foregoing amounts to about any other of the foregoing amounts.

In some embodiments, the first pigment-containing mixture may include the silica sand in an amount of about 48, 49, 50, 51, 52, 53, 54, 55, 56, 57, 58, 59, 60, 61, 62, 63, 64, 65, 66, 67, 68, 69, 70, 71, 72, or 73% by weight. Further, according to some embodiments of the present invention, the silica sand may be present in an amount of from about any of the foregoing amounts to about any other of the foregoing amounts.

In some embodiments, the first pigment-containing mixture may include the first coloring pigment in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2.0% by weight. Further, according to some embodiments of the present invention, the first coloring pigment may be present in an amount of from about any of the foregoing amounts to about any other of the foregoing amounts.

Step (b)

Step (b) of the inventive method for preparing the artificial silica marble is a step of preparing a first mixture of the artificial silica marble by wet-mixing an unsaturated polyester resin with the first pigment-containing mixture of step (a).

The kind of unsaturated polyester resin is not specifically limited. In exemplary embodiments, the unsaturated polyester resin prepared by a condensation reaction between a saturated and/or unsaturated dibasic acid and a polyhydric alcohol can be used.

Examples of the saturated and/or unsaturated dibasic acid can include without limitation maleic anhydride, citraconic acid, fumaric acid, itaconic acid, phthalic acid, phthalic anhydride, isophthalic acid, terephthalic acid, succinic acid, adipic acid, sebacic acid, tetrahydrophthalic acid, and the like, and mixtures thereof.

Examples of the polyhydric alcohol can include without limitation ethylene glycol, diethylene glycol, triethylene glycol, propylene glycol, dipropylene glycol, tripropylene glycol, polypropylene glycol, 1,3-butylene glycol, hydrogenated bisphenol-A, trimethylolpropane monoarylether, neopentyl glycol, 2,2,4-trimethyl-1,3-pentadiol, glycerin, and the like, and mixtures thereof.

If necessary, monobasic acid, such as acrylic acid, propionic acid, benzoic acid and the like, and/or polybasic acid such as trimellitic acid or tetracarboxylic acid of benzol, and the like, as well as mixture thereof, may further be used.

The unsaturated polyester resin can be in a solid state. A solid unsaturated polyester resin can have lower unsaturated polyester resin content than a liquid unsaturated polyester resin, and so the artificial silica marble can have excellent mechanical strength and surface hardness.

The unsaturated polyester resin according to the present invention can be used in an amount of about 5 to about 15% by weight based on 100% by weight of the first mixture comprising the unsaturated polyester resin, silica powder, silica sand and the first coloring pigment. In some embodiments, the first mixture of the artificial silica marble may include the unsaturated polyester resin in an amount of about 5, 6, 7, 8, 9, 10, 11, 12, 13, 14, or 15% by weight. Further, according to some embodiments of the present invention, the unsaturated polyester resin may be present in an amount of from about any of the foregoing amounts to about any other of the foregoing amounts.

When the first mixture of the artificial silica marble includes the unsaturated polyester resin in an amount within the above range, the artificial marble can have excellent elasticity and tensile strength.

Step (c)

Step (c) of the inventive method for preparing the artificial marble is a step of crushing the first mixture of the artificial silica marble prepared in step (b).

The first mixture of the artificial silica marble resulting from steps (a) and (b) is solid state and has a non-uniform particle size, because the solid particles have non-uniform stickiness. For this reason, to make the particle size uniform, step (c) of crushing the first mixture is performed.

A method for crushing the mixture in step (c) is not limited. Generally, the size of the particles can be made uniform by passing the first mixture of the artificial silica marble of step (b) through two rolls being rotated at high speed at a regular distance from each other.

Step (d)

Step (d) of the inventive method for preparing the artificial marble is a step of preparing a second mixture of the artificial silica marble by dispersing a second pigment-containing mixture in the crushed first mixture of the artificial silica marble of step (c). The second pigment-containing mixture comprises the silica powder, the silica sand and the second coloring pigment.

According to the present invention, the first coloring pigment is introduced in step (a), and a second coloring pigment different from the coloring pigment introduced in step (a) is introduced in step (d). The second pigment-containing mixture dispersed in the first mixture in step (d) forms amorphous patterns by forming a line pattern portion through step (e).

The second pigment-containing mixture that is used in step (d) is subjected to a dispersion step so as to have a uniform particle size, before it is introduced.

Examples of the second coloring pigment used in the second pigment-containing mixture in step (d) include without limitation organic and/or inorganic pigments and/or dyes. In exemplary embodiments, examples of the second coloring pigment can include without limitation red brown pigments such as iron oxide, yellow pigments such as iron hydroxide, green pigments such as chromium oxide, navy blue pigments such as sodium aluminosilicate, white pigments such as titanium oxide, black pigments such as carbon black, and the like, and combinations thereof. The second coloring pigment that is used in step (d) of forming the line pattern portion in the artificial marble should differ from the first coloring pigment used in step (a), because these pigments should provide different colors.

In order to form fine lines in the artificial marble, the second pigment-containing mixture should be added in step (d). The second pigment-containing mixture comprises the second coloring pigment, the silica powder and the silica sand. If the coloring pigment is added alone, fine lines cannot be formed, because the coloring pigment has a very small particle size so that it penetrates between the matrix particles of the artificial silica marble. On the other hand, when the coloring pigment is added in a mixture with the silica powder and the silica sand, the particle diameter of the pigment can be increased by the silica powder and the silica sand, and thus the coloring pigment will not penetrate between the matrix particles of the artificial silica marble, and the matrix particles of the artificial silica marble can be coated with the pigment-containing mixture to form fine lines.

In order to form a lump shape by adding the second pigment-containing mixture to the first mixture of the artificial silica marble, the second pigment-containing mixture should surround the first mixture of the artificial silica marble. Thus, the second pigment-containing mixture can be in a solid state.

The second pigment-containing mixture comprises about 25 to about 74% by weight of the silica powder having a particle diameter of about 10 µm to about 45 µm, about 25 to about 74% by weight of the silica sand having a particle diameter of about 0.1 mm to about 5.6 mm, and about 1 to about 50% by weight of the second coloring pigment.

In some embodiments, the second pigment-containing mixture may include the silica powder in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, or 74% by weight. Further, according to some embodiments of the present invention, the silica powder may be present in an amount of from about any of the foregoing amounts to about any other of the foregoing amounts.

In some embodiments, the silica powder may have a particle diameter of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 µm. Further, according to some embodiments of the present invention, the silica powder may have a particle diameter from about any of the foregoing diameters to about any other of the foregoing diameters.

In some embodiments, the second pigment-containing mixture may include the silica sand in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, or 74% by weight. Further, according to some embodiments of the present invention, the silica sand may be present in an amount of from about any of the foregoing amounts to about any other of the foregoing amounts.

In some embodiments, the silica sand may have a particle diameter of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, or 5.6 mm. Further, according to some embodiments of the present invention, the silica sand may have a particle diameter from about any of the foregoing diameters to about any other of the foregoing diameters.

In some embodiments, the second pigment-containing mixture may include the second coloring pigment in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, second coloring pigment may be present in an amount of from about any of the foregoing amounts to about any other of the foregoing amounts.

If the amount of the second coloring pigment is less than about 1% by weight, the line pattern portion may not be formed due to forming fine lines having a width of less than about 50 µm, and if the amount of the second coloring pigment is more than about 50% by weight, lines having a width greater than about 500 µm may be formed, and thus a line pattern portion having lump-shaped amorphous patterns separated from each other may not be formed.

The second pigment-containing mixture is used in an amount of about 1 to about 25 parts by weight based on about 100 parts by weight of the first mixture of the artificial silica marble. In some embodiments, the second pigment-containing mixture is used in an amount of about 1, 2, 3, 4, 5, 6, 7, 8, 9, 10, 11, 12, 13, 14, 15, 16, 17, 18, 19, 20, 21, 22, 23, 24, or 25 parts by weight. Further, according to some embodiments of the present invention, the second pigment-containing mixture may be used in an amount of from about any of the foregoing amounts to about any other of the foregoing amounts.

If the amount of the second pigment-containing mixture is less than about 1 parts by weight, the line pattern portion may not be formed due to forming fine lines having a width of less than about 50 µm, and if the amount of the second pigment-containing mixture is more than about 25 parts by weight, lines having a width greater than about 500 µm can be formed, and thus a line pattern portion having lump-shaped amorphous patterns separated from each other may not be formed.

Particulars regarding the silica powder and the silica sand, which are used in step (d), are as described above with respect to step (a), and thus the detailed description thereof are omitted.

Step (e)

Step (e) of the inventive method for preparing the artificial marble is a step of molding an artificial marble from the second mixture of the artificial silica marble of step (e).

Because the second mixture of the artificial silica marble is in a solid state, it can be molded into an artificial silica marble plate using a vacuum-vibration-compression molding process. This molding process is well-known to those skilled in the art.

In step (d) of the inventive method for preparing the artificial marble, one or more additives such as but not limited to inorganic fillers, crosslinking agents, polymerization initiators, coupling agents, curing accelerators, flame retardants, antistatic agents, antimicrobial agents, defoaming agents, dispersing agents, molecular weight controlling agents, UV absorbers, and the like, and combinations thereof, may be used.

The inorganic filler that may be used in the present invention may be any inorganic powder, such as but not limited to calcium carbonate, aluminum hydroxide, silica, alumina, barium sulfate, magnesium hydroxide, and the like, and combinations thereof which is generally used in the field to which the present invention pertains. The inorganic filler can have a particle size of about 1 µm to about 100 µm. In exemplary embodiments aluminum oxide can be used, which can provide an artificial marble having a transparent and beautiful appearance. The inorganic filler may be used in an amount of about 140 to about 200 parts by weight based on about 100 parts by weight of the artificial silica marble.

The crosslinking agent that is used in the present invention can be a multifunctional methacrylate. Examples of multifunctional methacrylates include without limitation ethylene glycol dimethacrylate, propylene glycol dimethacrylate, glycerol trimethacrylate, trimethylpropane trimethacrylate, bisphenol-A dimethacrylate, and the like, and combinations thereof. The crosslinking agent may be used in an amount of about 0.1 to about 5.0 parts by weight based on about 100 parts by weight of the artificial silica marble.

Examples of the polymerization initiator that may be used in the present invention may include peroxides, such as but not limited to benzoyl peroxide, lauroyl peroxide, butyl hydroperoxide, cumyl hydroperoxide, and the like, azo compounds, such as but not limited to azobisisobutyronitrile, as well as combinations thereof. In addition, an accelerator for promoting the rate of polymerization, such as an organic metal salt and/or organic amine, may be used. The polymerization initiator may be used in an amount of about 0.1 to about 5.0 parts by weight based on about 100 parts by weight of the artificial silica marble.

The coupling agent that may be used in the present invention serves to assist in the coupling between the inorganic filler and the resin and can be suitably selected by those skilled in the art. Examples of the coupling agent include, but are not limited to, silane-based coupling agents such as 3-(trimethoxysilyl)propyl methacrylate, vinyltrimethoxysilane, vinyltriethoxysilane, and the like, and combinations thereof. The coupling agent may be used in an amount of about 0.1 to about 1.0 parts by weight based on about 100 parts by weight of the artificial silica marble.

The first mixture of the artificial silica marble prepared in steps (a), (b) and (c) of the preparation method of the present invention constitutes the matrix of the artificial silica marble, and the second pigment-containing mixture added in step (d) constitutes the line pattern portion of the artificial silica marble.

The artificial silica marble of the present invention comprises: (A) an unsaturated polyester resin; (B) a silica powder having a particle diameter of about 10 µm to about 45 µm; (C) a silica sand having a particle diameter of about 0.1 mm to about 5.6 mm, and (D) a coloring pigment. In exemplary embodiments, the artificial silica marble of the present invention comprises: (A) about 5 to about 15% by weight of the unsaturated polyester resin; (B) about 20 to about 35% by weight of the silica powder having a particle diameter of about 10 µm to about 45 µm; (C) about 48 to about 73% by weight of the silica sand having a particle diameter of about 0.1 mm to about 5.6 mm; and (D) about 0.01 to about 2.0% by weight of the coloring pigments.

In some embodiments, the artificial silica marble may include the unsaturated polyester resin in an amount of about 5, 6, 7, 8, 9, 10, 11, 12, 13, 14, or 15% by weight. Further, according to some embodiments of the present invention, the unsaturated polyester resin may be present in an amount of from about any of the foregoing amounts to about any other of the foregoing amounts.

In some embodiments, the artificial silica marble may include the silica powder in an amount of about 20, 21, 22, 23, 24, 25, 26, 27, 28, 29, 30, 31, 32, 33, 34, or 35% by weight. Further, according to some embodiments of the present invention, the silica powder may be present in an amount of from about any of the foregoing amounts to about any other of the foregoing amounts.

In some embodiments, the artificial silica marble may include the silica sand in an amount of about 48, 49, 50, 51, 52, 53, 54, 55, 56, 57, 58, 59, 60, 61, 62, 63, 64, 65, 66, 67, 68, 69, 70, 71, 72, or 73% by weight. Further, according to some embodiments of the present invention, the silica sand may be present in an amount of from about any of the foregoing amounts to about any other of the foregoing amounts.

In some embodiments, the artificial silica marble may include the coloring pigments (first and second) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2% by weight. Further, according to some embodiments of the present invention, the coloring pigments may be present in an amount of from about any of the foregoing amounts to about any other of the foregoing amounts.

The artificial silica marble of the present invention may further comprise one or more additives.

Particulars about the unsaturated polyester resin, silica powder and silica sand described above with respect to steps (a) and (b) and the additives described with respect to step (d) can be applied to the artificial silica marble, and thus the detailed description is omitted.

Hereinafter, the present invention will be described in further detail with reference to examples. It is to be understood, however, that these examples are for illustrative purposes only and are not intended to limit the scope of the present invention.

EXAMPLES

Raw Materials for Artificial Marble

Particulars regarding each component used in Examples and Comparative Examples below are as follows:

(A) Unsaturated polyester resin: ATM 100 (Aekyung Co. Ltd., Korea).

(B) Silica powder: SP-300 (21 Century Co., Ltd., Korea) having a particle diameter of 1 µm to 45 µm.

(C) Silica sand: PM G600 (Polat Inc.) having a particle diameter of 0.1 mm to 1.2 mm.

(D) Coloring pigments (D1) First coloring pigment: BROWN 645 (Woosin Co., Ltd.).

(D2) Second coloring pigment: Yellow 3910 (Woosin Co., Ltd.).

Example and Comparative Examples 1-4

Preparation of Artificial Marbles

Each Component for the matrix of an artificial marble is dry-mixed with each other in the amounts shown in Table 1 below to prepare the first pigment-containing mixture. Unsaturated polyester resin is wet-mixed with the first pigment-containing mixture to prepare the first mixture forming the matrix of an artificial silica marble, and the first mixture is crushed. A second pigment-containing mixture including components for the line pattern portion of the artificial marble in the amounts shown in Table 1 below is added to the crushed first mixture to prepare the second mixture of the artificial silica marble, which is then dispersed. The second mixture of the artificial silica marble is molded into the artificial silica marble plate using a vacuum-vibration-compression molding process.

Comparative Example 5

Preparation of Artificial Marble

An artificial marble is prepared in the same manner as described in the Example and Comparative Examples 1 to 4 above, except that the second pigment-containing mixture including components for the line pattern portion of the artificial marble in the amounts shown in Table 1 below is added in the step of preparing the first mixture forming the matrix of the artificial silica marble.

In Table 1 below, the amounts of components for the matrix of the artificial silica marble are based on 100% by weight of the artificial silica marble matrix comprising components (A), (B), (C) and (D), and the amounts of components for the line pattern portion of the artificial silica marble are based on 100 parts by weight of the artificial silica marble matrix.

TABLE 1

|  |  | Example | Comparative Examples | | | | |
|---|---|---|---|---|---|---|---|
|  |  |  | 1 | 2 | 3 | 4 | 5 |
| Matrix of artificial marble | (A) | 9.9 | 9.9 | 9.9 | 9.9 | 9.9 | 9.9 |
|  | (B) | 30.0 | 30.0 | 30.0 | 30.0 | 30.0 | 30.0 |
|  | (C) | 60.0 | 60.0 | 60.0 | 60.0 | 60.0 | 60.0 |
|  | (D1) | 0.1 | 0.1 | 0.1 | 0.1 | 0.1 | 0.1 |
| Line pattern portion of artificial marble | (B) | 3.5 | 4.95 | 2.0 | 0.17 | 10.5 | 3.5 |
|  | (C) | 4.0 | 5.0 | 2.0 | 0.2 | 12.0 | 4.0 |
|  | (D2) | 2.5 | 0.05 | 6.0 | 0.13 | 7.5 | 2.5 |

FIGS. 1-6 are photographs showing the cross-sections of the artificial marbles prepared in the Example and Comparative Examples 1-5.

As shown in FIG. 1, artificial silica marble of the Example, which satisfies the composition ratio, input ratio and input timing of the second pigment-containing mixture of the present invention, forms an amorphous pattern including lump-like portions due to partition by a line pattern portion, which includes a web or net of fine lines having a width of about 50 to about 500 μm.

However, in Comparative Example 1 in which the second coloring pigment is added in a very small amount, no line is formed, and in Comparative Example 2 in which the second coloring pigment is added in an excessive amount, the lines formed in the cross-section of the artificial marble have a width of about 500 μm or more, and surface defects occur.

In addition, in Comparative Example 3 in which the second pigment-containing mixture is added in a very small amount, no line is formed, and in Comparative Example 4 in which the second pigment-containing mixture is added in an excessive amount, the lines formed in the cross-section of the artificial marble have a width of about 500 μm or more, and surface defects occur In addition, in Comparative Example 5 in which the second pigment-containing mixture is added in the step of preparing the first mixture forming the matrix of the artificial silica marble, the second pigment-containing mixture is dispersed without forming lines.

As described above, the present invention provides a novel artificial silica marble having formed therein lump-shaped amorphous patterns and a novel method for preparing the artificial silica marble.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An artificial silica marble comprising an unsaturated polyester resin matrix and a line pattern portion, wherein the line pattern portion comprises fine lines having a width of about 50 to about 500 μm and forming a web- or net-like pattern, wherein the line pattern portion divides the artificial silica marble into a plurality of irregularly shaped pattern portions to form an amorphous pattern in the cross section of the artificial silica marble.

2. A method for preparing an artificial silica marble having an amorphous pattern, the method comprising the steps of:
   (a) dry-mixing a silica powder, a silica sand and a first coloring pigment to prepare a first pigment-containing mixture;
   (b) wet-mixing an unsaturated polyester resin with the first pigment-containing mixture to prepare a first mixture of the artificial silica marble;
   (c) crushing the first mixture of the artificial silica marble;
   (d) dispersing a second pigment-containing mixture including a silica powder, a silica sand and a second coloring pigment in the crushed first mixture of the artificial silica marble to prepare a second mixture of the artificial silica marble; and
   (e) molding the second mixture of the artificial silica marble.

3. The method of claim 2, wherein the first pigment-containing mixture that is prepared in step (a) comprises about 20 to about 35% by weight of the silica powder having a particle diameter of about 10 to about 45 μm, about 48 to about 73% by weight of the silica sand having a particle diameter of about 0.1 to about 5.6 mm, and about 0.01 to about 2.0% by weight of the first coloring pigment based on 100% by weight of the first mixture of the artificial silica marble comprising the unsaturated polyester resin, the silica powder, the silica sand, and the first coloring pigment.

4. The method of claim 2, wherein the unsaturated polyester resin that is used in step (b) is used in an amount of about 5 to about 15% by weight based on 100% by weight of the first mixture of the artificial silica marble comprising the unsaturated polyester resin, the silica powder, the silica sand and the first coloring pigment.

5. The method of claim 2, wherein the second pigment-containing mixture that is used in step (d) comprises about 25 to about 74% by weight of the silica powder having a particle diameter of about 10 to about 45 μm, about 25 to about 74% by weight of the silica sand having a particle diameter of about 0.1 to about 5.6 mm, and about 1 to about 50% by weight of the second coloring pigment.

6. The method of claim 2, wherein the second pigment-containing mixture that is used in step (d) is used in an amount of about 1 to about 25 parts by weight based on about 100 parts by weight of the first mixture of the artificial silica marble.

7. The method of claim 2, wherein the first coloring pigment and the second coloring pigment differ from each other.

8. The method of claim 7, wherein the first coloring pigment and the second coloring comprise an organic pigment, an inorganic pigment, or a combination thereof.

9. The method of claim 8, wherein the first coloring pigment and the second coloring pigment are different pigments and comprise iron oxide, iron hydroxide, chromium oxide, sodium aluminosilicate, titanium oxide, carbon black, or a combination thereof.

10. The method of claim 2, further comprising adding one or more additives selected from the group consisting of inorganic fillers, crosslinking agents, polymerization initiators, coupling agents, curing accelerators, flame retardants, antistatic agents, antimicrobial agents, defoaming agents, dispersing agents, molecular weight controlling agents, UV absorbers, and combinations thereof into the crushed first mixture of the artificial silica marble in step (d).

11. An artificial silica marble prepared by the method of claim 2, wherein the artificial silica marble comprising a matrix and a line pattern portion, wherein the line pattern portion comprises fine lines having a width of about 50 to about 500 µm and forming a web- or net-like pattern, wherein the line pattern portion divides the artificial silica marble into a plurality of irregularly shaped pattern portions to form an amorphous pattern in the cross section of the artificial silica marble.

12. An artificial silica marble including a matrix and a line pattern portion, the artificial silica marble comprising:
   (A) about 5 to about 15% by weight of an unsaturated polyester resin;
   (B) about 20 to about 35% by weight of a silica powder having a particle diameter of about 10 to about 45 µm;
   (C) about 48 to about 73% by weight of a silica sand having a particle diameter of about 0.1 to about 5.6 mm; and
   (D) about 0.01 to about 2.0% by weight of coloring pigments.

13. The artificial silica marble of claim 12, wherein the line pattern portion comprises about 25 to about 74% by weight of a silica powder having a particle diameter of about 10 to about 45 µm, about 25 to about 74% by weight of a silica sand having a particle diameter of about 0.1 to about 5.6 mm, and about 1 to about 50% by weight of a second coloring pigment.

\* \* \* \* \*